(12) United States Patent
Szarecki et al.

(10) Patent No.: US 12,500,833 B1
(45) Date of Patent: Dec. 16, 2025

(54) MITIGATION OF CONGESTION LOSS RISK FOR MPLS LOCAL-PROTECTION WITH FACILITY-BACKUP

(71) Applicant: Google LLC, Mountain View, CA (US)

(72) Inventors: Rafal Szarecki, Livermore, CA (US); Jonathan Robert Mitchell, Ashburn, VA (US)

(73) Assignee: Google LLC, Mountain View, CA (US)

(*) Notice: Subject to any disclaimer, the term of this patent is extended or adjusted under 35 U.S.C. 154(b) by 274 days.

(21) Appl. No.: 18/140,229

(22) Filed: Apr. 27, 2023

Related U.S. Application Data

(60) Provisional application No. 63/449,197, filed on Mar. 1, 2023.

(51) Int. Cl.

| | |
|---|---|
| *G06F 15/173* | (2006.01) |
| *H04L 45/00* | (2022.01) |
| *H04L 45/125* | (2022.01) |
| *H04L 45/50* | (2022.01) |
| *H04L 47/122* | (2022.01) |

(52) U.S. Cl.
CPC .......... *H04L 45/125* (2013.01); *H04L 45/22* (2013.01); *H04L 45/50* (2013.01); *H04L 47/122* (2013.01)

(58) Field of Classification Search
None
See application file for complete search history.

(56) References Cited

U.S. PATENT DOCUMENTS

| | | | |
|---|---|---|---|
| 8,369,213 B2* | 2/2013 | Vasseur | H04L 45/50 709/239 |
| 9,246,838 B1 | 1/2016 | Shen et al. | |
| 9,253,097 B1* | 2/2016 | Barman | H04L 47/122 |
| 9,473,392 B2 | 10/2016 | Del Regno et al. | |
| 10,250,487 B2 | 4/2019 | Dave | |
| 10,355,980 B2 | 7/2019 | Tambakuwala et al. | |
| 10,659,290 B1 | 5/2020 | Jork et al. | |
| 10,728,087 B2 | 7/2020 | Agarwal et al. | |
| 2007/0011284 A1* | 1/2007 | Le Roux | H04L 47/70 709/223 |
| 2017/0244621 A1 | 8/2017 | Kompella et al. | |

OTHER PUBLICATIONS

Extended European Search Report for European Patent Application No. 23188386.9 dated Jul. 19, 2024. 7 pages.

(Continued)

*Primary Examiner* — Wing F Chan
*Assistant Examiner* — Andrew Woo
(74) *Attorney, Agent, or Firm* — Lerner David LLP

(57) ABSTRACT

An aspect of the disclosed technology is a process, apparatus, and/or system that provides a capability to automatically derive the bandwidth required for a given bypass tunnel, and use it to compute a compliant path across the network, without reserving bandwidth of a given bypass along its path. This may be implemented by computing (e.g., summing) the signaled bandwidth required of all MPLS LSPs supported by a given bypass tunnel. The computation may be done as part of bypass tunnel re-optimization or re-signaling, prior to the Constrained Shortest Path First (CSPF) algorithm or procedure being run by the PLR or periodically.

20 Claims, 3 Drawing Sheets

(56) References Cited

OTHER PUBLICATIONS

Pan et al. Fast Reroute Extensions to RSVP-TE for LSP Tunnels. Internet Citation, Jan. 31, 2002 (Jan. 31, 2002), Retrieved from the Internet: <http://www.watersprings.org/pub/id/draft-ietf-mpls-rsvp-lsp-fastreroute-00.txt>. 33 pages.

Vasseur et al. MPLS Traffic Engineering Fast reroute: bypass tunnel path computation for bandwidth protection. draft-vasseur-mpls-backup-computation-02.txt. Internet Engineering Task Force, IETF; Standard Working Draft, IN, No. 2, Feb. 28, 2003 (Feb. 28, 2003). 53 pages.

* cited by examiner

100

MITIGATION OF CONGESTION LOSS RISK FOR MPLS LOCAL-PROTECTION WITH FACILITY-BACKUP

CROSS-REFERENCE TO RELATED APPLICATIONS

The present application claims the benefit of the filing date of U.S. Provisional Patent Application No. 63/449,197, filed Mar. 1, 2023, the disclosure of which is hereby incorporated herein by reference.

BACKGROUND

Multiprotocol Label Switching (MPLS) provides a mechanism that forwards data packets based on labels instead of network addresses, e.g., the labels identify pathways between endpoints rather, than just endpoints. In an MPLS network, labels are assigned to packets. Forwarding decisions are made based on the contents of the labels, which avoids having to examine the contents of the packet itself, as in the case, for example, of IP routing. For example, traditionally each switch in a network performs an internet protocol (IP) routing lookup, determines a next-hop based on its routing table, and then forwards a packet to the next-hop. With MPLS, only the first device performs a routing lookup. However, instead of finding the next-hop, the first device determines the ultimate destination and a path to that destination. The path an MPLS packet traverses is called a label switched path (LSP).

MPLS includes a mechanism that provides local protection of each LSP passing through a facility to mitigate against failure on the path (so-called MPLS local protection). MPLS local protection with facility backup establishes a bypass tunnel in anticipation of the possibility that a protected resource (e.g., network link, node) may fail in the future. The bypass tunnel starts on a device immediately upstream of a protected resource (i.e., the Point of Local Repair or PLR) and terminates on a device downstream of the protected resource (i.e., Merge Point or MP). The MPLS LSP that normally traverses the protected resource uses the bypass tunnel for packet transmissions in the event that a protected resource fails.

SUMMARY

Aspects of the disclosed technology may be embodied in a method, process, apparatus, and/or system.

For example, the disclosed technology may comprise a method or process for determining a bypass tunnel in a multi-path label switching (MPLS) network. The method/process comprises computing a bandwidth required to support one or more label switched paths protected by the bypass tunnel based on a bandwidth value of the protected label switched paths; determining a bypass path in the MPLS network capable of supporting the computed bandwidth; signaling the bypass tunnel along the bypass path capable of supporting the computed bandwidth; associating the bypass path with the one or more label switch paths; and identifying the bypass path as the bypass tunnel.

In accordance with this aspect of the disclosed technology, computing the bandwidth comprises computing a bandwidth associated with all label switched paths associated with the bypass tunnel. Further, computing may be done periodically. In addition, computing may be done immediately prior to calling a constrained shortest path first (CSPF) procedure for the bypass tunnel as part of a bypass tunnel re-optimization procedure or re-signaling triggering procedure.

Further still, the method/process may also comprise computing an updated bandwidth value, comparing the updated bandwidth value to a bandwidth value previously used for bypass path calculation, and determining an updated bypass path when the comparison indicates that the updated bandwidth value has changed by a certain amount relative to the computed value.

Further in accordance with this aspect of the disclosed technology, the bypass path has sufficient bandwidth to support the bypass path and other label switched paths associated with the path.

In addition, the method/process may also comprise transmitting a Resource Reservation Protocol (RSVP) PATH message with explicit route object to nodes along computed the bypass path. The RSVP PATH message may not include information that causes the computed bandwidth to be reserved along the bypass path.

In accordance with this aspect of the disclosed technology, the computing, determining, and associating steps are performed by a label switched router. The method/process may also comprise determining a bandwidth associated with a set of label switched paths different than the one or more label switched paths and reserving a reserved bandwidth for the set of label switched paths along the bypass path without reserving the computed bandwidth. In addition, the bypass path is signaled without bandwidth reservation or with reservation of a different bandwidth.

Another aspect of the disclosed technology may comprise an apparatus or system for a bypass tunnel in a multi-path label switching (MPLS) network. The apparatus/system comprises a processing element; and a memory storing instructions that cause the processing element to: compute a bandwidth required to support one or more label switched paths protected by the bypass tunnel based on a bandwidth value of the protected label switched paths, determine a bypass path in the MPLS network capable of supporting the computed bandwidth, signal the bypass tunnel along the bypass path capable of supporting the computed bandwidth, associate the bypass path with the one or more label switch paths, and identify the bypass path as the bypass tunnel.

Further in accordance with this aspect of the disclosed technology, the instructions may cause the processing element to compute the bandwidth associated with all label switched paths associated with the bypass tunnel. The instructions may also cause the processing element to compute the bandwidth periodically. The instructions may also cause the processing element to compute the bandwidth immediately prior to calling a constrained shortest path first (CSPF) procedure for the bypass tunnel as part of a bypass tunnel re-optimization procedure or re-signaling triggering procedure. Further, the instructions may cause the processing element to compute an updated bandwidth value, compare the updated bandwidth value to a bandwidth value previously used for bypass path calculation, and determine an updated bypass path when the comparison indicated that the updated bandwidth value has changed by a certain amount relative to the computed value.

Further in accordance with this aspect of the disclosed technology, the bypass path has sufficient bandwidth to support the bypass path and other label switched paths associated with the path. In addition, the instructions may also cause the processing element to transmit a RSVP PATH message with explicit route object to nodes along computed the bypass path. The RSVP PATH message does not include information that causes the computed bandwidth to be reserved along the bypass path.

In accordance with this aspect of the disclosed technology, the apparatus/system may comprise a label switched router.

Further in accordance with this aspect of the disclosed technology, the instructions may cause the processing element to determine a bandwidth associated with a set of label switched paths different than the one or more label switched paths and reserve a reserved bandwidth for the first set of label switched paths along the bypass path without reserving the computed bandwidth. Further, the bypass path can be signaled without bandwidth reservation or with reservation of a different bandwidth.

DETAILED DESCRIPTION

Figure 1:
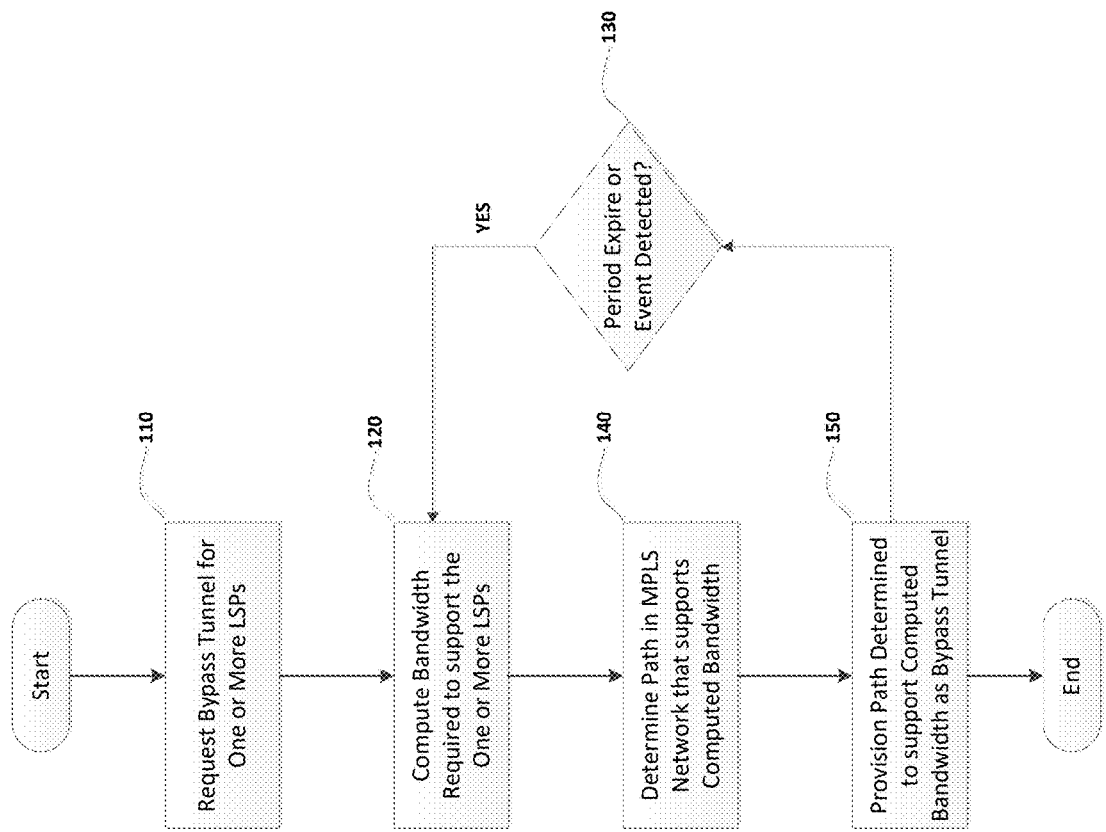
FIG. 1 illustratively depicts a process or method in accordance with one or more aspects of the disclosed technology.

Conventionally, it is not atypical for multiple MPLS LSPs to share a single bypass tunnel for backup protection. Current implementations typically allow for automatic MP identification or bandwidth reservation in setting up a bypass tunnel. Further, the bandwidth that needs to be reserved must be explicitly configured on PLR devices. Current implementations typically suffer from the following defects: 1) if a bypass tunnel is created without bandwidth reservation, it may not be capable of carrying the traffic volume of the protected MPLS LSPs on failover, which results in congestion on the traffic bypass path and potential traffic loss; 2) to reserve bandwidth for a bypass tunnel, operators typically approximate how much bandwidth should be reserved and configure the PLR with the estimated bandwidth value; and 3) bandwidth reservation is inefficient, given that use of the reserved bandwidth is most often short and sporadic and given that each link typically supports multiple bypass tunnels, the foregoing efficiency is multiplied to the point where a significant amount of the capacity of a link may be unused.

An aspect of the disclosed technology is a process, apparatus, and/or system that provides a capability to automatically derive the bandwidth required for a given bypass tunnel. This may be implemented by computing (e.g., summing) the signaled bandwidth required of all MPLS LSPs protected by a given bypass tunnel. The computation may be done as part of bypass tunnel re-optimization or re-signaling, prior to the Constrained Shortest Path First (CSPF) algorithm or procedure being run by the PLR—periodically. Re-optimization or re-build of a bypass tunnel can be triggered for a number of reasons. For example, re-optimization or re-build can be triggered when a failure along an existing bypass path destroys an existing bypass tunnel so as to trigger re-signaling. As another example, an expire event in the periodic re-optimization timer can trigger optimization. Path computation via the CSPF procedure is part of the foregoing procedures. If done periodically, when the CSPF procedure is executed, the most recently computed bandwidth value will typically be used. In addition, a scaling or threshold function or factor may be applied to the computed bandwidth value (e.g., increase of computed bandwidth by at least 10%) to reduce CPU usage and signal churn for negligible changes.

An aspect of the disclosed technology is a process and/or system that provides a capability to re-trigger a CSPF procedure based on a change in the computed bandwidth. In some implementations, if a newly computed bandwidth value is meaningfully different than the previously computed value, this may be used to trigger re-optimization of the bypass tunnel so that a new path is recalculated for the bypass tunnel. For example, where the bandwidth of a bypass tunnel is determined periodically, a scaling or threshold function or factor may be applied to the computed bandwidth value (e.g., increase of computed bandwidth by at least 10%) to reduce CPU usage and signal churn for negligible changes.

An aspect of the disclosed technology is a process and/or system that decouples the bandwidth required to support a bypass tunnel via the constrained shortest path computation (CSPF) from the bandwidth used by the Resource Reservation Protocol (RSVP) signaling reservation. In other words, the path designated for a bypass tunnel is one in which the computed bandwidth is not reserved, but the designated path has sufficient (available) capacity to support the bypass tunnel (unreserved) and any other traffic that is being carried by the designated path (reserved).

One or more aspects of the disclosed technology eliminates the approximation involved in determining the bandwidth that a bypass tunnel will need to protect associated MPLS LSPs. The disclosed technology also resolves the potential congestion problem and inefficient use of bandwidth by reserving resources for the typically infrequent use during failover on a bypass tunnel. The disclosed technology may take the form of one or more software modules or instructions that are processed by one or more processing devices. Those processing devices may reside in a label switched router (LSR), e.g., the router immediately upstream of a protected resource or the PLR. The above computations may comprise a process that is incorporated into the CSPF procedure. In general, a PLR uses the CSPF procedure and traffic engineering database to compute the path that a bypass tunnel will be signaled along. The output of this procedure or process is an Explicit Route Object (ERO) used in the RSVP PATH message. The aspects of this inventive technology may form one or more processes that are added to the conventional CSPF procedure.

Turning now to FIG. 1, there is shown a process or method 100 in accordance with an aspect of the disclosed technology. Process 100 is initially triggered (block 110) upon detection of a request for a bypass tunnel to protect one or more LSPs. The request may be part of a request for LSPs on a MPLS network. For example, a customer may request that backup paths be maintained for each LSP that is commissioned or provisioned to carry data packets or traffic it sends through a network. Alternatively, the request may be part of a Fast Reroute (FRR) facility backup mechanism in which bypass tunnels are created automatically to protect high priority traffic against link and link-node failures.

In response to receiving the bypass tunnel request, the bandwidth required to support the one or more LSPs is computed (block 120). The computation comprises a sum of the reserved bandwidth for all of the LSPs that would be protected by a given bypass tunnel. The computed bandwidth value may be represented by a bypass CSPF bandwidth attribute or parameter (cspf-bandwidth) used for a local CSPF computation. A new, actual value of cspf-bandwidth should be determined prior to execution of the CSPF algorithm or procedure for a given bypass tunnel, regardless of what triggers the request for the bypass tunnel. In this regard, the cspf-bandwidth attribute for a given bypass tunnel may be implemented as an event-driven calculation or a periodic calculation (decision diamond 130). The event-driven implementation may be triggered as a result of bypass optimization (e.g., reoptimize timer expiration, link failure along a bypass path, etc.). In the case of an event-driven cspf-bandwidth calculation, the implementation should guard against excessive calculations that could potentially be caused by a high rate of CSPF calculation triggers. In the case of periodic calculations, the time period to trigger recalculation should be configurable with a minimum value that is not longer than the re-optimization interval of the re-optimize timer and with a maximum value that is longer or greater than the re-optimization interval. Such a maximum value can be chosen so as to reduce churn and computational costs. Further, changes in the protected LSP bandwidth or path should not be a trigger for bypass tunnel re-optimization. In addition, the computed CSPF bypass bandwidth should not be subtracted from the Reservable/Available bandwidth on the bypass egress interface. Once the computed bandwidth is determined, a path that supports that bandwidth is determined for use as the bypass tunnel (block 140). This determination can be performed as part of the CSPF algorithm or procedure. As one skilled in the art may appreciate, CSPF computes the shortest path through a network that fulfills a set of constraints. Such constraints typically include minimum available (not reserved) bandwidth required per link, affinity-groups, excluded SRLGs, as well other constraints. In accordance with an aspect of the disclosed technology, the path for supporting the bypass tunnel would use the previously computed bandwidth as a constraint. By taking into account the computed bandwidth, the CSPF algorithm would take into account the bandwidth used by other LSPs (and not included in the computation block 120) on the links that may comprise a path for the bypass tunnel. In this way, in the event of a node or link failure on the path that normally transports the one or more LSPs, this bypass tunnel path would have been predetermined to have sufficient bandwidth to carry the one or more LSPs that are being protected without disrupting other LSPs that make use of links and nodes along the bypass path.

Using the path determined at block 140, the process then provisions the path for use by the bypass tunnel (block 150). In accordance with an aspect of the disclosed technology, the path is established while using zero bandwidth (i.e., without reserving the bandwidth needed for the bypass tunnel path). More specifically, the disclosed technology decouples the bandwidth requirement (e.g., cspf-bandwidth value) used for the CSPF calculation or determination and the RSVP bypass tunnel signaling. Thus, the explicitly configured or computed bandwidth (as discussed herein) is used for the CSPF determination, but another value, e.g., typically zero, is used for the bandwidth in the RSVP bypass signaling. As such, the Explicit Route Object (ERO) returned by the CSPF calculation and used as for the signaling path provisions or encodes the network path along which unreserved (available) capacity is sufficient to handle the traffic volume protected by the bypass tunnel. This provides as an advantage mitigating, e.g., minimizing, the risk of congestion along a bypass tunnel path in the event of a failure associated with a protected resource and switchover of traffic onto the bypass tunnel. Further, because in accordance with the disclosed technology bypass tunnels do not reserve bandwidth along their respective paths, all the reservable bandwidth is available if needed by other LSPs. These advantages result in economic feasibility.

The computed or derived value for the cspf-bandwidth attribute should be supported alongside the pre-existing bandwidth attribute (e.g., for JUNOS the "bandwidth" attribute and for IOS-XR the "signaled-bandwidth"). For example, if both the "cspf-bandwidth" and "bandwidth"/"signaled-bandwidth" attributes are provided, the value for "cspf-bandwidth" must be greater than or equal to the "bandwidth"/"signaled-bandwidth" value. Further, the value of the "cspf-bandwidth" attribute is used as a constraint for the CSPF computation. In addition, the value of "bandwidth"/"signaled-bandwidth" is used for LSP path signaling along the explicit route (ERO) computed using the CSPF algorithm or procedure using the "csfp-bandwidth" value. These considerations reflect the general concept that where a bypass has explicit bandwidth reservation requirements, these requirements should be honored. In accordance with such a configuration, e.g., where cspf-bandwidth and "bandwidth"/"signaled bandwidth" are associated with respective bandwidths, a bypass path should have enough available bandwidth to accommodate bypass traffic while reserving some portion for LSPs. In this way, should conditions change (e.g., new LSP is commissioned) at least some portion of the bypass traffic can still be supported on the bypass path.

Alternatively, as another example, the disclosed technology may be implemented if only the "bandwidth"/"signaled-bandwidth" attribute is supported. Specifically, if only a value for the "bandwidth"/"signaled-bandwidth" attribute is provided, as is in the case of conventional systems, the value of "bandwidth"/"signaled-bandwidth" is used as a constraint for CSPF and for LSP path signaling. The disclosed technology may also be implemented in the case where only the "cspf-bandwidth" attribute is supported. In this latter case, the value of "cspf-bandwidth" would be used as a constraint for the CSPF computation and the LSP path is signaled without a bandwidth reservation (e.g., 0 bits per second (bps) bandwidth reservation). In cases where neither "cspf-bandwidth" nor "bandwidth"/"signaled-bandwidth" is provided, CSPF is computed without a bandwidth constraint (0 bps) and the LSP path is signaled with 0 bps bandwidth reservation (i.e., without bandwidth reservation).

The foregoing features of the disclosed technology may be implemented using the command line interface (CLI) in Junos and IOS-XR as follows:

| JUNOS OS | IOS-XOR |
|---|---|
| interface ae1.0 { | attribute-set auto-backup bypass |
| ... | ... |
| link-protection { | affinity ignore |
| bandwidth <bps> | priority <setup> <hold> |
| cspf-bandwidth auto; | signalled-bandwidth <value> |
| optimize timer 900; | cspf-bandwidth auto |
| } | |
| } | |

The foregoing CLI mockups are for illustration purposes only and an actual implementation may use a different a CLI.

In addition to using a computed bandwidth value as described, the disclosed technology may also cover implementations where the value of the cspf-bandwidth attribute or parameter is explicitly provided, e.g., specified as input.

With respect to FIG. 1, in this implementation the bandwidth value at block 120 would comprise a value that is explicitly provided. In accordance with this implementation, the configured or explicitly provided CSPF bypass bandwidth should not be subtracted from the RSVP reservable/available bandwidth on the egress interface of the bypass tunnel. The value specified for the cspf-bandwidth attribute should be supported along with the pre-existing bandwidth attribute (e.g., for JUNOS the "bandwidth" attribute and for IOS-XR the "signaled-bandwidth"). For example, if both the "cspf-bandwidth" and "bandwidth"/"signaled-bandwidth" attribute are provided, the value for "cspf-bandwidth" must be greater than or equal to the "bandwidth"/"signaled-bandwidth" value. Further, the value of the "cspf-bandwidth" attribute is used as a constraint for the CSPF computation. In addition, the value of "bandwidth"/"signaled-bandwidth" is used for LSP path signaling along the explicit route (ERO) computed using the CSPF algorithm or procedure using the "csfp-bandwidth" value. Alternatively, as another example, the disclosed technology may be implemented if only the "bandwidth"/"signaled-bandwidth" attribute is supported. Specifically, if only a value for the "bandwidth"/"signaled-bandwidth" attribute is provided, as is in the case of conventional systems, the value of "bandwidth"/"signaled-bandwidth" is used as a constraint for CSPF and for LSP path signaling. The disclosed technology may also be implemented in the case where only the "cspf-bandwidth" attribute is supported. In this latter case, the value of "cspf-bandwidth" would be used as a constraint for the CSPF computation and the LSP path is signaled without a bandwidth reservation (e.g., 0 bits per second (bps) bandwidth reservation). In cases where neither "cspf-bandwidth" nor "bandwidth"/"signaled-bandwidth" is provided, CSPF is computed without a bandwidth constraint (0 bps) and the LSP path is signaled with 0 bps bandwidth reservation (i.e., without bandwidth reservation).

The foregoing features of the explicitly provided implementation may be provided using the command line interface (CLI) in Junos and IOS-XR as follows:

| JUNOS OS | IOS-XR |
| --- | --- |
| interface ae1.0 { <br> ... <br> link-protection { <br>   bandwidth <bps> <br>   cspf-bandwidth <bps>; <br>   optimize timer 900; <br>   priority <setup> <hold> <br> } <br> } | attribute-set auto-backup bypass <br> ... <br> priority <setup> <hold> <br> signalled-bandwidth <value> <br> cspf-bandwidth <value> |

The foregoing CLI mockups are for illustration purposes only and an actual implementation may use a different a CLI.

In either case, where the cspf-bandwidth parameter is computed or explicitly provided as input, the implementation should support existing bypass features. Such features should include, but are not limited to, allowing periodical optimization using, for example, the standard LSP re-optimization interval; allowing bypass tunnel path re-computation in response to bypass path failures (e.g., respective PATH messages, interface down, ISIS, overload bit, etc.); changes to a bypass path and its state should not result in protected LSPs re-optimizations; and if a given bypass tunnel no longer has any LSPs to protected, it should be torn down or un-provisioned.

Other considerations include, for example, where the cspf-bandwidth attribute is configured and the CSPF procedure uses a bandwidth constraint set to the value of the cspf-bandwidth attribute but is unable to find a bypass tunnel path (i.e., CSPF fails with cspf-bandwidth attribute value), the implementation should execute again the CSPF procedure with the bandwidth constraint set to "bandwidth"/"signaled-bandwidth" attribute value (if configured) or with the a default bandwidth of 0 bps (if explicit "bandwidth"/"signaled-bandwidth" is not configured) as a fallback. In such a case: (a) an appropriate log and state should be generated so that the information that bypasses on the fallback/secondary path can be identified and the time spent by the bypass on the fallback/secondary path should be extractable (e.g., from the log timestamps, or state timer); (b) the bypass tunnel LSP path should be signaled with a bandwidth equal to the value of the "bandwidth"/"signaled-bandwidth" attribute (if configured) or otherwise with the default 0 bps bandwidth; and (c) at expiration of the next periodic re-optimization time, CSPF with a bandwidth constraint set to the value of cspf-bandwidth is run.

Additional considerations include, as long as a given LSP is protected by the bypass, any bandwidth change on the bypass should not result in signaling to the LSP head-end (i.e., no explicit RESV/PATHERR message).

In accordance with the disclosed technology, the bandwidth constraints and reservations may be summarized as follows:

| cspf-bandwidth attribute value | "bandwidth"/ "signaled-bandwidth" attribute value | Bandwidth constraints for CSPF computation only | Bandwidth reserved (RSVP state, PATH message) |
| --- | --- | --- | --- |
| Not configured | Not configured | 0 bps | 0 bps |
| Not configured | X bps | X bps | X bps |
| Y bps | Not configured | Y bps | 0 bps |
| Y bps | X bps | Y bps | X bps |

Y≥X, X=0, and Y=0 are legal values; the value of Y can be configured as a fixed value (e.g., explicitly set) or derived/computed before the CSPF algorithm runs to determine the bandwidth that is needed to protect one or more LSPs by a given bypass tunnel.

Figure 2:
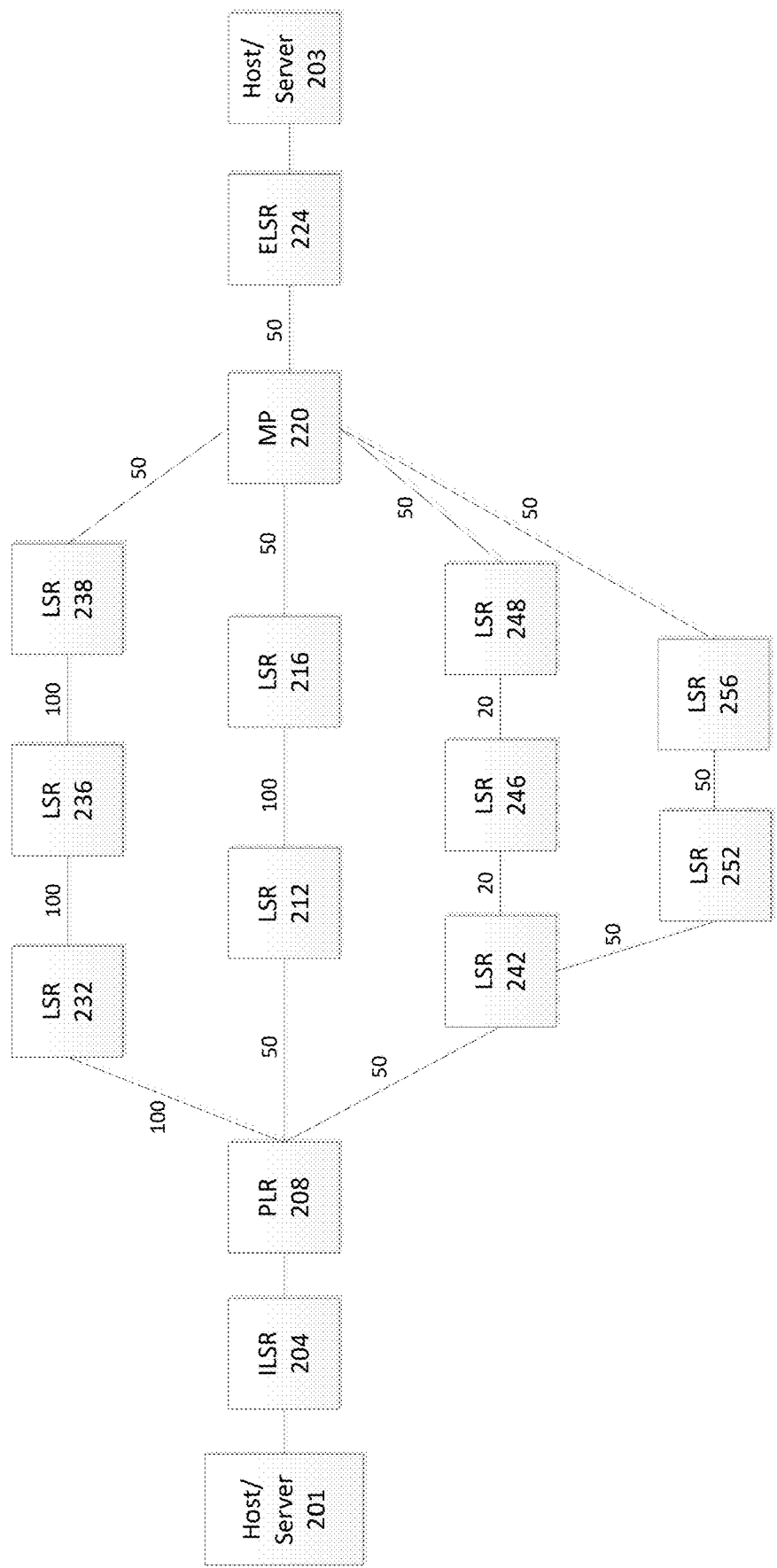
FIG. 2 illustratively depicts an example MPLS system in accordance with one or more aspects of the disclosed technology.

Turning now to FIG. 2, there is shown an example of network 200 in which one or more aspects of the disclosed technology may be implemented. The network 200 is used by host/sever 201 to communicate with host/server 203. The network is shown as being comprised of a number of label switched routers that implement an MPLS network. For the purposes of this explanation, it is assumed that an application running on the host/server 201 requires a bandwidth on each link in the network of 50 units (e.g., a unit may comprise megabits/second (Mb/s), gigabits/second (Gb/s) or bits/second (bps)) to support one or more LSPs between host/server 201 and host/server 203. In addition, the network is engineered such that normal traffic flow between host/server 201 and host/server 203 traverses ingress LSR (ILSR) 204, PLR 208, LSR 212, LSR 216, MP 220, and egress LSR (ELSR) 224.

PLR 208 comprises a router that functions as the point of local repair. PLR 208 includes the processing capability, e.g., logic including instructions and data, associated memory, and storage, to implement the processes associated with process 100 of FIG. 1. Specifically, PLR 208 determines a path for a bypass tunnel that will provide protection in the event of failure along the path designated for normal traffic flow. For instance, given the requirement that 50 units of bandwidth is needed to support the traffic between host/server 201 and host/server 203, PLR 208 would eliminate the path traversing LSRs 242, 246, and 248, as the links between these routers are limited to an available bandwidth of 20 units. In contrast, PLR 208 would determine that paths including LSRs 232, 236, and 238 or LSRs 242, 252, and 256 would be satisfactory as bypass paths for the traffic in the event of node or link failure on the normal traffic path. Assuming, for example, that the path including LSRs 242, 252, and 256 is chosen as the bypass path, PLR 208 would then provision or encode this path to act as a bypass tunnel in the event of such failure.

As indicated above, PLR 208 may also periodically compute whether a chosen bypass path is available. For example, assuming that the path formed by LSRs 242, 252, and 256 is chosen as the bypass path and that the path is no longer able to support the 50 units bandwidth requirement, either because of failure of link or node, or that LSPs on the link have increased their bandwidth usage. PLR 208 would detect this change and recompute a new bypass path, e.g., path including LSRs 232, 236, and 238, that may be used as a bypass path for communications between host/server 201 and host/server 203.

Figure 3:
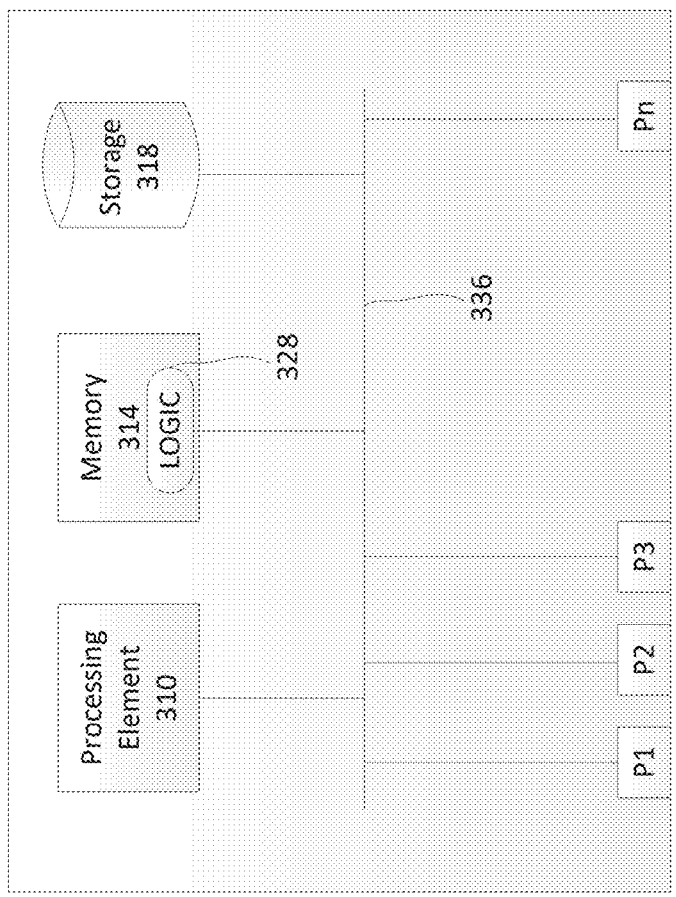
FIG. 3 illustratively depicts an example of an apparatus in accordance with one or more aspects of the disclosed technology.

Turning now to FIG. 3, there is shown an apparatus 300 in accordance with one or more aspects of the disclosed technology. The apparatus includes a processing element 310, memory 314, storage 318, and a number of ports, P1 through Pn. The memory 314 is shown as including logic 328, though logic 328, or a copy of it, may also be included in storage 318. Processing element 310, memory 314, storage 318 and ports P1 through Pn can communicate with each other via internal bus 336. Apparatus 300 may comprise a Label Switched Router (LSR) that functions as a Point of Local Repair (PLR).

Processing element 310 may comprise any conventional processor, such as commercially available CPUs. Alternatively, the one or more processors may be a dedicated device such as an ASIC or other hardware-based processor. Processing element 310 operates to perform instructions that control the operations of apparatus 300, including processing data incoming on ports P1 through Pn and outputting that data on one or more of those ports. Generally, processing element 310 enables apparatus 300 to performs the functions of a label switched router. Those functions are typically embodied in a set of instructions, including any set of instructions to be executed directly (such as machine code) or indirectly (such as scripts) by the processing element 310. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance.

In addition to instructions, processing element 310 may also use data that may be retrieved, stored, or modified by processing element 310 in accordance with the instructions discussed above. The instructions may take the form of logic 328 that resides in memory 314 and that are accessed by processing element 310. In accordance with the disclosed technology, logic 328 may comprise instructions for carrying out the process discussed above in relation to FIGS. 1 and 2. Specifically, logic 328 may comprise instructions that cause processing element 310 to determine one or more paths that effect bypass protection by determining a bypass path that meets certain bandwidth criteria but does not reserve that bandwidth when encoding or provisioning the bypass path.

Storage 318 may comprise a local disk residing in apparatus 300 that stores the instructions and data needed by processing element 310 to determine a bypass path and communicated with other network elements or equipment via ports P1 through Pn. Ports P1 through Pn will typically comprise ethernet ports that connect to other networks such as the Internet, World Wide Web, intranets, virtual private networks, wide area networks, local networks, private networks using communication protocols proprietary to one or more companies, IPv4, IPv6, MPLS, Ethernet, WiFi, HTTP, etc., and various combinations of the foregoing. With reference to FIG. 2, these ports enable the PLR device to communicate with the other routers, LSRs, and MPs on the network.

The disclosed technology may be implemented as a process or method, or in an apparatus or system. Examples of such implementations may include the following method and apparatus with the following features:

F1. A method for determining a bypass tunnel in a multi-path label switching (MPLS) network, comprising:
  computing a bandwidth required to support one or more label switched paths protected by the bypass tunnel based on a bandwidth value of the protected label switched paths;
  determining a bypass path in the MPLS network capable of supporting the computed bandwidth;
  signaling the bypass tunnel along the bypass path capable of supporting the computed bandwidth;
  associating the bypass path with the one or more label switch paths; and
  identifying the bypass path as the bypass tunnel.

F2. The method of F1, wherein computing the bandwidth comprises computing a bandwidth associated with all label switched paths associated with the bypass tunnel.

F3. The method of any of F1 and F2, wherein computing is done periodically.

F4. The method of any one of F1 through F3, wherein computing is done immediately prior to calling a constrained shortest path first (CSPF) procedure for the bypass tunnel as part of a bypass tunnel re-optimization procedure or re-signaling triggering procedure.

F5. The method of any one of F1 through F4, comprising computing an updated bandwidth value, comparing the updated bandwidth value to a bandwidth value previously used for bypass path calculation and determining an updated bypass path when the comparison indicates that the updated bandwidth value has changed by a certain amount relative to the computed value.

F6. The method of any one of F1 through F5, wherein the bypass path has sufficient bandwidth to support the bypass path and other label switched paths associated with the path.

F7. The method of any one of F1 through F6, comprising transmitting a RSVP PATH message with explicit route object to nodes along computed the bypass path.

F8. The method of F7, wherein the RSVP PATH message does not include information that causes the computed bandwidth to be reserved along the bypass path.

F9. The method of any one of F1 through F8, wherein the computing, determining and associating steps are performed by a label switched router.

F10. The method of any one of F1 through F9, comprising determining a bandwidth associated with a set of label switched paths different than the one or more label switched paths and reserving a reserved bandwidth for the set of label switched paths along the bypass path without reserving the computed bandwidth.

F11. The method of any one F1 through F10, wherein the bypass path is signaled without bandwidth reservation or with reservation of a different bandwidth.

F12. An apparatus for determining a bypass tunnel in a multi-path label switching (MPLS) network, comprising:
a processing element; and
a memory storing instructions that cause the processing element to:
compute a bandwidth required to support one or more label switched paths protected by the bypass tunnel based on a bandwidth value of the protected label switched paths,
determine a bypass path in the MPLS network capable of supporting the computed bandwidth,
signal the bypass tunnel along the bypass path capable of supporting the computed bandwidth,
associate the bypass path with the one or more label switch paths, and identify the bypass path as the bypass tunnel.

F13. The apparatus of F12, wherein the instructions cause the processing element to compute the bandwidth, wherein the computing comprises computing a bandwidth associated with all label switched paths associated with the bypass tunnel.

F14. The apparatus of any one of F12 through F13, wherein the instructions cause the processing element to compute the bandwidth periodically.

F15. The apparatus of any one F12 through F14, comprising the instructions causing the processing element to compute the bandwidth immediately prior to calling a constrained shortest path first (CSPF) procedure for the bypass tunnel as part of a bypass tunnel re-optimization procedure or re-signaling triggering procedure.

F16. The apparatus of any one of F12 through F15, comprising the instructions causing the processing element to compute an updated bandwidth value, compare the updated bandwidth value to a bandwidth value previously used for bypass path calculation, and determine an updated bypass path when the comparison indicates that the updated bandwidth value has changed by a certain amount relative to the computed value.

F17. The apparatus of any one of F12 through F16, wherein the bypass path has sufficient bandwidth to support the bypass path and other label switched paths associated with the path.

F18. The apparatus of any one of F12 through F17, comprising the instructions causing the processing element to transmit an RSVP PATH message with explicit route object to nodes along computed the bypass path.

F19. The apparatus of F18, wherein the RSVP PATH message does not include information that causes the computed bandwidth to be reserved along the bypass path.

F20. The apparatus of any one of F12 through F19, comprising the instructions causing the processing element to determine a bandwidth associated with a set of label switched paths different than the one or more label switched paths and reserve a reserved bandwidth for the first set of label switched paths along the bypass path without reserving the computed bandwidth.

F21. The apparatus of any one of F12 through F20, wherein the bypass path is signaled without bandwidth reservation or with reservation of a different bandwidth.

F22. The apparatus of any one of F12 through F21, wherein the apparatus comprises a label switched router.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for determining a bypass tunnel in a multi-path label switching (MPLS) network, comprising:
computing a bandwidth required to support one or more label switched paths protected by the bypass tunnel based on a bandwidth value of the protected label switched paths;
determining a bypass path in the MPLS network capable of supporting the computed bandwidth;
signaling the bypass tunnel along the bypass path capable of supporting the computed bandwidth, wherein the bypass tunnel is signaled without bandwidth reservation;
associating the bypass path with the one or more label switch paths; and
identifying the bypass path as the bypass tunnel.

2. The method of claim 1, wherein computing the bandwidth comprises computing a bandwidth associated with all label switched paths associated with the bypass tunnel.

3. The method of claim 1, wherein computing is done periodically.

4. The method of claim 1, wherein computing is done immediately prior to calling a constrained shortest path first (CSPF) procedure for the bypass tunnel as part of a bypass tunnel re-optimization procedure or re-signaling triggering procedure.

5. The method of claim 1, comprising computing an updated bandwidth value, comparing the updated bandwidth value to a bandwidth value previously used for bypass path calculation, and determining an updated bypass path when the comparison indicates that the updated bandwidth value has changed by a certain amount relative to the computed bandwidth.

6. The method of claim 1, wherein the bypass path has sufficient bandwidth to support the bypass path and other label switched paths associated with the bypass path.

7. The method of claim 1, comprising transmitting an RSVP PATH message with explicit route object to nodes along the bypass path.

8. The method of claim 7, wherein the RSVP PATH message does not include information that causes the computed bandwidth to be reserved along the bypass path.

9. The method of claim 1, wherein the computing, determining, and
associating steps are performed by a label switched router.

10. The method of claim 1, comprising determining a bandwidth associated with a set of label switched paths different than the one or more label switched paths and reserving a reserved bandwidth for the set of label switched paths along the bypass path without reserving the computed bandwidth.

11. An apparatus for determining a bypass tunnel in a multi-path label switching (MPLS) network, comprising:
a processing element; and
a memory storing instructions that cause the processing element to:

compute a bandwidth required to support one or more label switched paths protected by the bypass tunnel based on a bandwidth value of the protected label switched paths, determine a bypass path in the MPLS network capable of supporting the computed bandwidth, signal the bypass tunnel along the bypass path capable of supporting the computed bandwidth, wherein the bypass tunnel is signaled without bandwidth reservation, associate the bypass path with the one or more label switch paths, and identify the bypass path as the bypass tunnel.

12. The apparatus of claim 11, wherein the instructions cause the processing element to compute the bandwidth, wherein the computing comprises computing a bandwidth associated with all label switched paths associated with the bypass tunnel.

13. The apparatus of claim 11, wherein the instructions cause the processing element to compute the bandwidth periodically.

14. The apparatus of claim 11, comprising the instructions causing the processing element to compute the bandwidth immediately prior to calling a constrained shortest path first (CSPF) procedure for the bypass tunnel as part of a bypass tunnel re-optimization procedure or re-signaling triggering procedure.

15. The apparatus of claim 11, comprising the instructions causing the processing element to compute an updated bandwidth value, compare the updated bandwidth value to a bandwidth value previously used for bypass path calculation, and determine an updated bypass path when the comparison indicates that the updated bandwidth value has changed by a certain amount relative to the computed bandwidth.

16. The apparatus of claim 11, wherein the bypass path has sufficient bandwidth to support the bypass path and other label switched paths associated with the bypass path.

17. The apparatus of claim 11, comprising the instructions causing the processing element to transmit an RSVP PATH message with explicit route object to nodes along the bypass path.

18. The apparatus of claim 17, wherein the RSVP PATH message does not include information that causes the computed bandwidth to be reserved along the bypass path.

19. The apparatus of claim 11, wherein the apparatus comprises a label switched router.

20. The apparatus of claim 11, comprising the instructions causing the processing element to determine a bandwidth associated with a set of label switched paths different than the one or more label switched paths and reserve a reserved bandwidth for the first set of label switched paths along the bypass path without reserving the computed bandwidth.

* * * * *